United States Patent
Shiraishi et al.

(10) Patent No.: US 6,655,244 B2
(45) Date of Patent: *Dec. 2, 2003

(54) CENTERING APPARATUS AND METHOD

(75) Inventors: Mitsuru Shiraishi, Kawasaki (JP);
Koichi Oikawa, Kawasaki (JP);
Hitoshi Komoriya, Kawasaki (JP);
Yutaka Nakamura, Kawasaki (JP);
Takao Hirahara, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,879

(22) Filed: Jun. 18, 1999

(65) Prior Publication Data

US 2002/0029667 A1 Mar. 14, 2002

Related U.S. Application Data

(63) Continuation-in-part of application No. 09/024,314, filed on Feb. 17, 1998, now abandoned.

(30) Foreign Application Priority Data

Oct. 15, 1997 (JP) ............................................. 9-281928
Jul. 2, 1998 (JP) ............................................ 10-187459

(51) Int. Cl.$^7$ ................................................ B23B 1/00
(52) U.S. Cl. ............................ 82/1.11; 82/173; 82/170; 369/270
(58) Field of Search ......................... 82/170, 1.11, 173, 82/164, 162, 150; 144/215.2; 301/35.627; 65/191; 335/262; 425/19; 360/77.01, 77.02

(56) References Cited

U.S. PATENT DOCUMENTS

| 1,799,179 | A | * | 4/1931 | Reis .......................... 82/162 X |
| 1,885,465 | A | * | 11/1932 | Moulton ...................... 164/288 |
| 2,146,959 | A | * | 2/1939 | Kugel ......................... 266/56 |
| 2,393,473 | A | * | 1/1946 | Jones ......................... 250/215 |
| 2,809,044 | A | * | 10/1957 | Landreth ................... 82/170 X |
| 2,956,463 | A | * | 10/1960 | Gibson ........................ 82/164 |
| 2,998,739 | A | * | 9/1961 | Martin et al. .................. 82/142 |
| 3,357,711 | A | * | 12/1967 | Fischer .......................... 279/6 |
| 3,433,919 | A | * | 3/1969 | Braudeau et al. ........... 204/222 |
| 3,760,855 | A | * | 9/1973 | Nilberg ..................... 82/170 X |
| 3,891,016 | A | * | 6/1975 | Nilberg ..................... 82/170 X |
| 4,514,839 | A | * | 4/1985 | Eisemann ................... 369/270 |
| 4,562,570 | A | * | 12/1985 | Denton ....................... 369/270 |
| 4,730,300 | A | * | 3/1988 | Kamoshita et al. ......... 369/270 |
| 4,746,131 | A | * | 5/1988 | Mathes ..................... 82/170 X |

FOREIGN PATENT DOCUMENTS

| JP | 6-39683 | | 2/1994 | |
| JP | 406039683 | * | 2/1994 | ................. 82/170 |

* cited by examiner

Primary Examiner—Henry W. H. Tsai
(74) Attorney, Agent, or Firm—Armstrong, Westerman & Hattori, LLP

(57) ABSTRACT

A centering apparatus for centering a disk about a center member such as a shaft or hub includes a plurality of pairs of actuator units. The actuator units of each of the pairs faces each other through the disk. Each of the actuator units has a member which moves linearly and can come into contact with the disk.

21 Claims, 16 Drawing Sheets

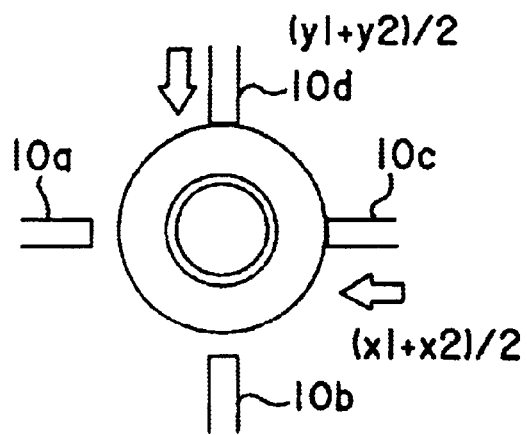
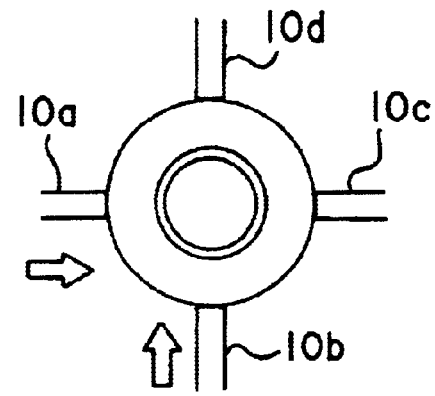
FIG.3A  FIG.3B
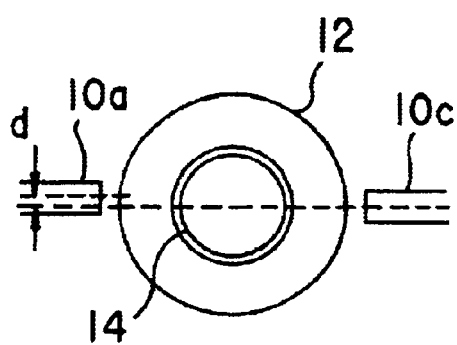
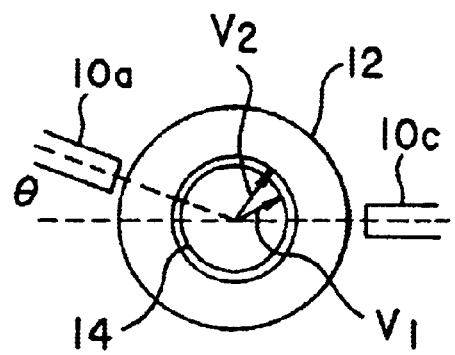
FIG.4A  FIG.4B

CENTERING APPARATUS AND METHOD

CROSS-REFERENCE TO RELATED APPLICATION

This is a continuation-in-part of prior application Ser. No. 09/024,314, filed Feb. 17, 1998, now abandoned.

BACKGROUND OF THE INVENTION

1. Field of the Invention

The present invention generally relates to a centering apparatus which centers a disk to a rotation center member such as a shaft or hub, and more particularly to a centering apparatus suitable for an operation in which a disk to be provided in a magnetic disk drive is centered to a shaft and attached thereto in order to record servo track information on the disk.

Generally, servo track information is recorded on disks, which are recording media of a magnetic disk drive. Usually, heads are positioned on the disks using a length measuring device in a state in which the magnetic disk drive is completely assembled. Then, servo track information is recorded on the disks.

However, the above recording operation has the following disadvantages.

First, it is very difficult to improve the precision of the servo track information in order to write servo track information by using the heads provided in the magnetic disk drive and thus improve the recording density. Second, the servo track information is recorded on all the disks by using all the heads of the magnetic disk drive and thus it takes a long time to complete the recording operation. This also increases the production cost.

An improvement directed to overcoming the above first disadvantage has been proposed in which servo track information is recorded on a single disk by means of an exclusive servo track information recording apparatus. The single recording disk is then installed in the magnetic disk drive. A plurality of such recording disks are prepared and each of the disks is then installed in a respective magnetic disk drive. Hence, the second disadvantages can be simultaneously overcome.

However, the above improvement has the following disadvantages. Disks are attached to a shaft or hub of the servo track recording apparatus with a certain eccentricity. Similarly, disks on which servo track information has been recorded are attached to hubs of the magnetic disk drives with a certain eccentricity. Generally, a gap approximately equal to 50 $\mu$m to 100 $\mu$m is provided between the edge of the opening of the disk and the outer circumference of the hub or shaft in order to facilitate an engagement operation in which the disk is engaged with the hub or shaft. If there is no eccentricity, the opening of the disk is evenly spaced apart from the outer circumference of the disk.

If an eccentricity occurs in a case where the disk is loaded to the servo track information recording apparatus and the servo track information is recorded thereon or in a case where the disk is loaded to the magnetic disk drive, the trace along which the servo information track has been recorded on the disk has an eccentricity with respect to the shaft or hub of the magnetic disk drive in the assembled state. The above eccentricity of the trace of the servo track information requires that the read/write head is operated with the same eccentricity with respect to the shaft or hub and thus degrades the read/write performance. Further, the above eccentricity causes a vibration during rotation and also degrades the read/write performance.

In order to reduce the eccentricity, the above-mentioned gap can be reduced. However, this requires each component to have a higher precision and thus increases the production cost. Further, the engagement operation becomes complex. It will be noted that the above problem occurs in all apparatus in which a disk is attached to a shaft or the like and is then centered.

SUMMARY OF THE INVENTION

It is a general object of the present invention to provide a centering apparatus and method in which the above disadvantages are eliminated.

A more specific object of the present invention is to provide a centering apparatus and method in which a disk having an opening can be centered about a shaft, hub or the like without eccentricity so that the edge of the opening of the disk can evenly be spaced apart from the outer circumference of the shaft or the like.

The above objects of the present invention are achieved by a centering apparatus for centering a disk about a center member, comprising a plurality of pairs of actuator units, the actuator units of each of the pairs facing each other through the disk, each of the actuator units having a member which moves linearly and can come into contact with the disk.

BRIEF DESCRIPTION OF THE DRAWINGS

Other objects, features and advantages of the present invention will become more apparent from the following detailed description when read in conjunction with the accompanying drawings, in which:

FIG. 3A is a diagram of a sequence of moving a disk to centering positions (centering operation);

FIG. 3B is a diagram of a sequence of moving a disk to centering positions (centering operations);

FIG. 4A is a diagram for explaining an influence of the assembly precision of the centering apparatus to the centering operation;

FIG. 4B is a diagram for explaining an influence of the assembly precision of the centering apparatus to the centering operation;

DESCRIPTION OF THE PREFERRED EMBODIMENTS

Figure 1:
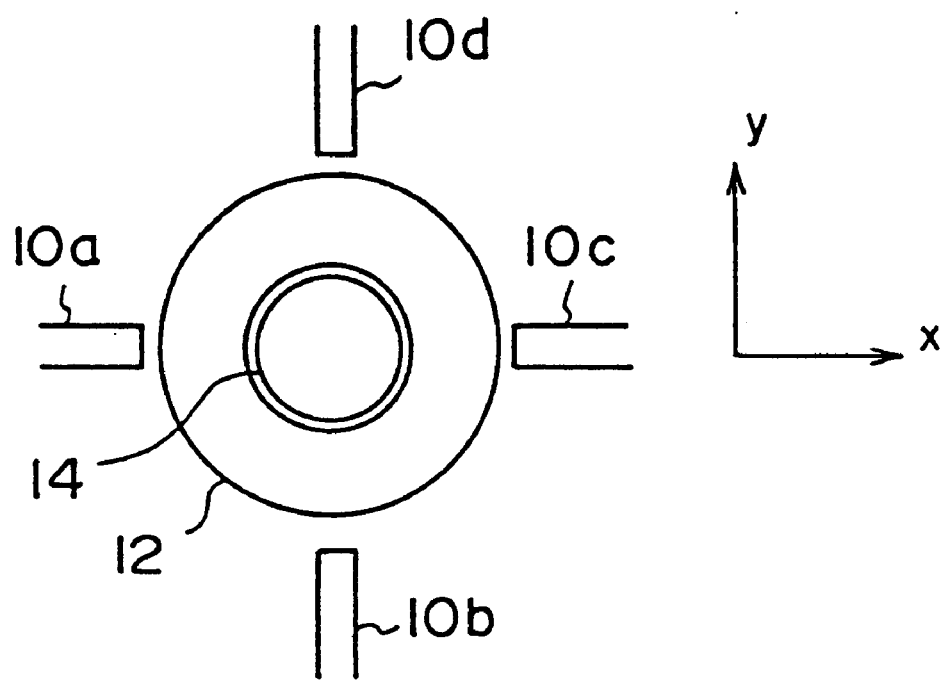
FIG. 1 is a diagram showing the principle of a centering apparatus and method according to the present invention.

FIG. 1 is a diagram showing the principle of the centering apparatus and method according to the present invention. The centering apparatus shown in FIG. 1 has four rods 10a, 10b, 10c and 10d. A pair of rods 10a and 10c faces each other via a disk 12, and a pair of rods 10b and 10d faces each other via the disk 12. The rods 10a and 10c can move in an X-axis direction, and the rods 10b and 10d can move in a Y-axis direction perpendicular to the X-axis direction. The X-axis direction includes the two directions along the X axis, and the Y-axis direction includes the two directions along the Y axis. The ends of the rods 10a–10d can come into contact with the outer edge of the disk 12. As shown in FIGS. 2A–2D, the centering position of the disk 12 with respect to a hub 14 is detected by using the four rods 10a–10d, and a centering operation is carried out as shown in FIGS. 3A and 3B. The hub 14 is attached to a shaft of a centering apparatus, as will be described later.

Figure 2A:
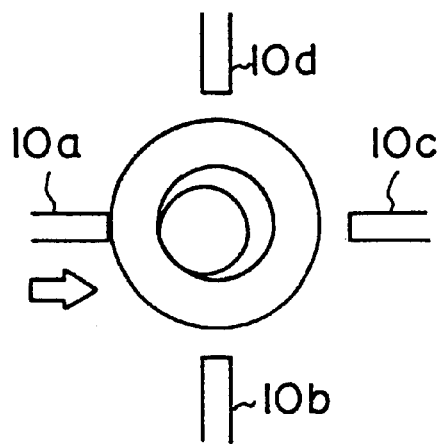
FIG. 2A is a diagram of a process for detecting a centering position based on the principle of the present invention.
Figure 2B:
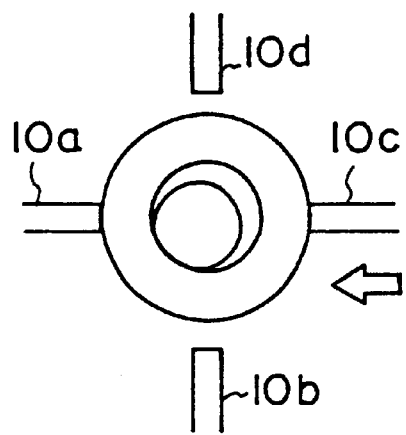
FIG. 2B is a diagram of a process for detecting a centering position based on the principle of the present invention.
Figure 2C:
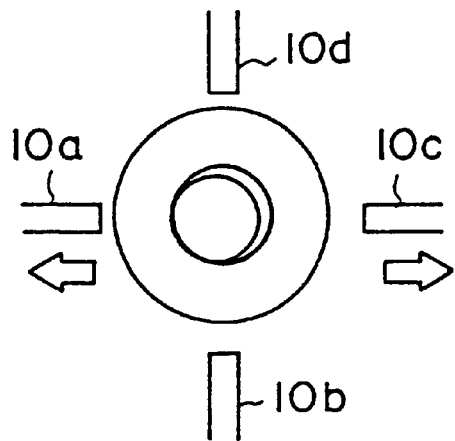
FIG. 2C is a diagram of a process for detecting a centering position based on the principle of the present invention.
Figure 2D:
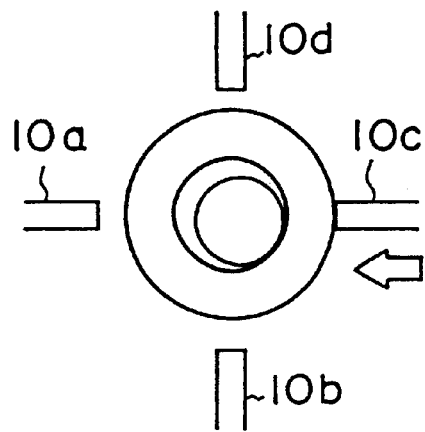
FIG. 2D is a diagram of a process for detecting a centering position based on the principle of the present invention.

The centering operation commences from the state shown in FIG. 1 in which the rods 10a–10d are spaced apart from the disk 12. First, as shown in FIG. 2A, the rod 10a is moved in the positive direction along the X axis until the end of the rod 10a comes into contact with the disk 12 and the inner edge of the disk 12 comes into contact with the hub 14. Next, as shown in FIG. 2B, the rod 10c is moved in the negative direction along the X axis, and a position x1 of the rod 10c observed in a state in which the end of the rod 10c comes into contact with the outer edge of the disk 12 is obtained. Then, as shown in FIG. 2c, the rods 10a and 10c are detached from the disk 12. Finally, as shown in FIG. 2D, the rod 10c is moved in the negative direction along the X axis, and a position x2 of the rod 10c is obtained in a state the end of the rod 10c comes into contact with the disk 12 and then the inner edge of the disk 12 comes into contact with the hub 14. A target position of the rod 10c can be represented as (x1+x2)/2. The target position of the rod 10c is a position to which the rod 10c is moved in the centering operation, which will be described later with reference to FIGS. 3A and 3B.

Similarly, the rods 10b and 10d are moved and the target position of the rod 10d (y1+y2)/2 is obtained. Then, the centering operation shown in FIGS. 3A and 3B is carried out. As shown in FIG. 3A, the rod 10c is moved to the target position (x1+x2)/2, and then the rod 10d is moved to the target position (y1+y2)/2. Then, as shown in FIG. 3B, the other rods 10a and 10b are moved to come into contact with the disk 12. Hence, the disk 12 can certainly be centered about the hub 14. That is, the inner edge of the disk 12 is spaced apart from the hub 14 at an equal interval at any position along the inner edge.

When the disk 12 is a disk on which servo track information should be recorded, the disk 12 can be positioned with respect to the hub 14 of the servo information recording apparatus without eccentricity. In this state, the disk 12 is attached to the hub 14. Hence, the servo track information can be recorded on the disk 12 without any displacement in the radial direction of the disk 12 so that the trace of the servo track information on the disk 12 does not have any eccentricity.

A description will now be given of a relationship between the centering operation and the assembly precision of the centering apparatus having the above-mentioned mechanism.

As shown in FIG. 4A, in a case where the rod 10a has an eccentricity such that the rod 10a deviates, by a distance d, from the center line passing through the center of the hub 14, the above eccentricity does not affect the centering precision if the distance d is equal to or less than the width of the rod 10a. FIG. 4B shows that the rod 10a is inclined (angular displacement) at an angle θ with respect to the center line. An error δ of the gap obtained in the state shown in FIG. 4B can be expressed as follows:

$$\delta = (r_2 - r_1)(1 - \cos\theta)$$

where $r_2$ denotes the inner radius of the disk 12 and $r_1$ denotes the radius of the hub 14. When assuming that $r_2 - r_1 = 100 \, \mu m$ and $\delta \leq 1 \, \mu m$, then $\theta \leq 8.1°$. Since the tolerable value of the angle $\theta$ is equal to or less than 8.1°, the centering apparatus has a large angular tolerance. Consequently, the assembly precision of the rods 10a–10d does not greatly affect the centering precision, and thus the centering apparatus can easily be produced.

Figure 5A:
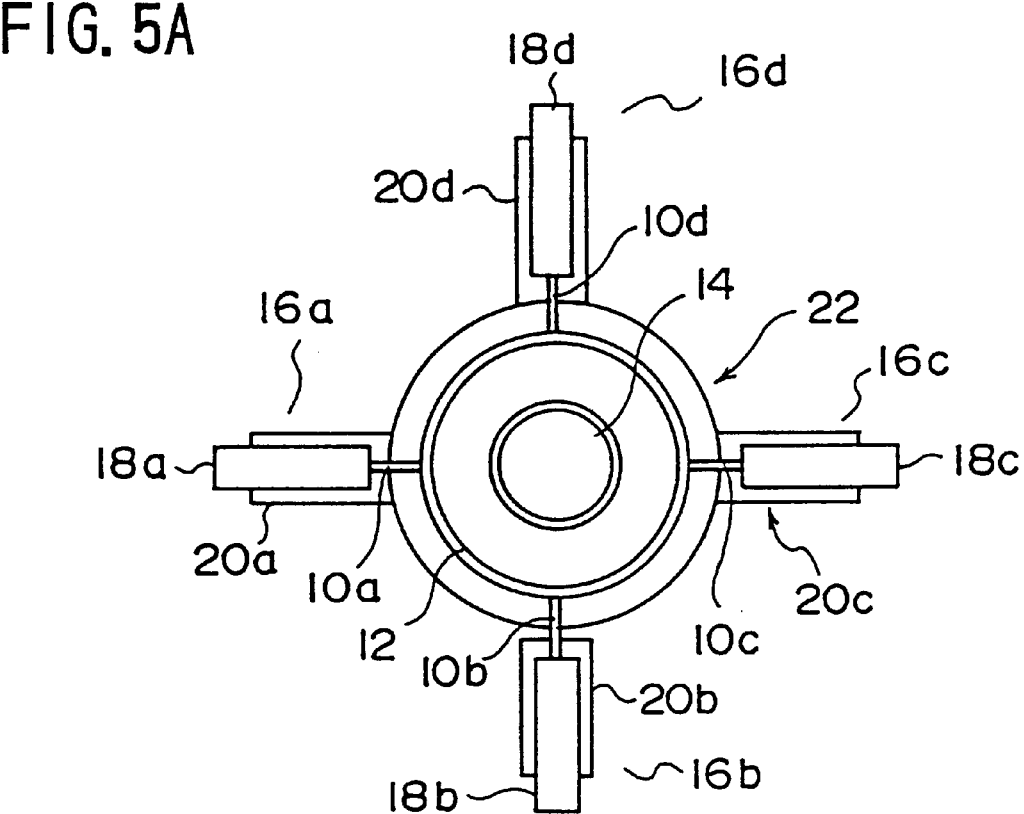
FIG. 5A is a plan view of a centering apparatus according to a first embodiment of the present invention.
Figure 5B:
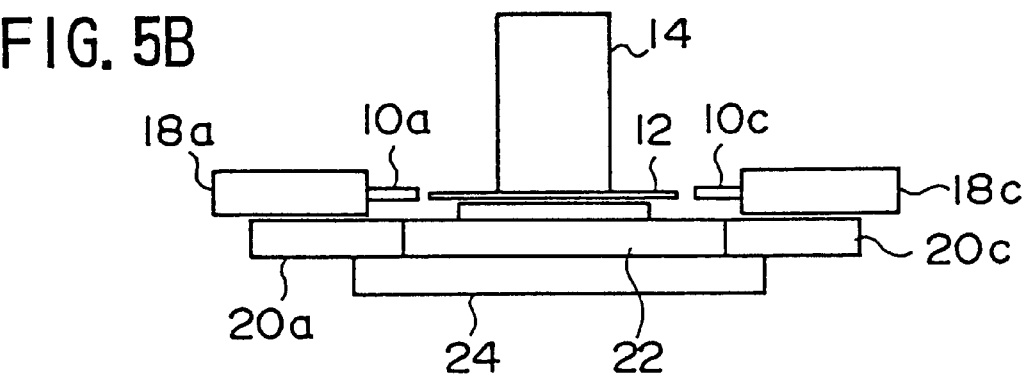
FIG. 5B is a side view of the centering apparatus shown in FIG. 5A.

A description will now be given, with reference to FIGS. 5A and 5B, of a first embodiment of the centering apparatus using the above principle. FIG. 5A is a plan view of the centering apparatus, and FIG. 5B is a side view thereof. The centering apparatus shown in FIGS. 5A and 5B has four actuator units 16a, 16b, 16c and 16d, which are respectively equipped with the rods 10a, 10b, 10c and 10d, linear actuators 18a, 18b, 18c and 18d, and actuator attachment plates 20a, 20b, 20c and 20d. The actuator units 16a and 16c is paired, and the actuator units 16b and 16d is paired. The linear actuators 18a–18d respectively move the rods 10a–10d linearly. The actuator attachment plates 20a–20d respectively support the linear actuators 18a–18d, and are supported by a base 24, which supports a centering unit base plate 22.

Figure 6:
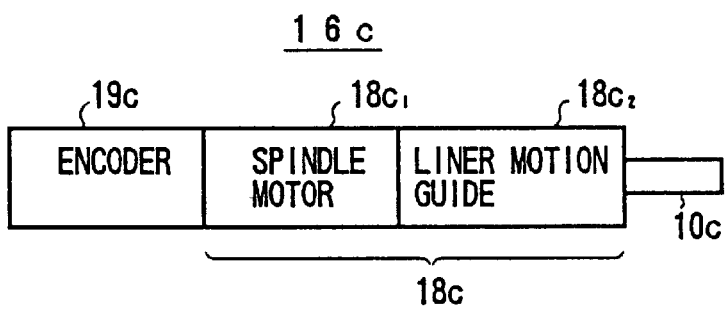
FIG. 6 is a diagram of an actuator unit shown in FIGS. 5A and 5B.

FIG. 6 is a diagram of the actuator unit 16c, which includes the aforementioned linear actuator 18c and an encoder 19c. The linear actuator 18c has a spindle motor $18c_1$ and a linear motion guide mechanism $18c_2$. The actuator unit itself using these structural components is known. The rational motion of the spindle motor $18c_1$ is converted into the linear motion by the mechanism $18c_2$, so that the rod 10c is moved linearly. The encoder 19c detects the angular (rotational) position of the spindle motor $18c_1$. Since the rotary motion of the motor $18c_1$ and the linear motion of the rod 10c have a linear relationship, the angular position of the motor $18c_1$ indicates the position of the rod 10c (on the X axis). The other actuator units 10a, 10b and 10d are configured as the actuator unit 10c.

Figure 7:
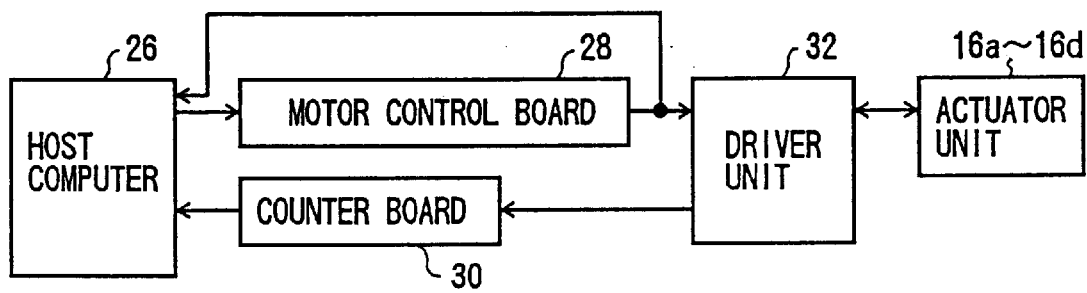
FIG. 7 is a block diagram of an electrical control system of the centering apparatus of the first and second embodiments of the present invention.

FIG. 7 is a block diagram of an electrical control system of the centering apparatus according to the first embodiment of the present invention. The electrical control system shown in FIG. 7 includes a host computer 26, a motor control board 28, a counter board 30 and a driver unit 32. The host computer 26, which may be formed of a personal computer or the like, controls the motor control board 28 in accordance with a program which realizes the operations shown in FIGS. 2A–2D and 3A–3B. The counter board 30 detects an encoder pulse from the encoder 19c shown in FIG. 6, and the angular position of the motor $18c_1$, that is, the position of the rod 10c. The encoder pulse is also used in such a manner that the host computer 26 determines whether the rod 10c comes into contact with the disk, as will be described later.

The motor control board 28 drives the driver unit 32 in response to an instruction issued by the host computer 26. The driver unit 32 supplies currents to the spindle motors of the actuator units 16a–16d, so that the spindle motors can be driven. For example, when executing the operation shown in FIG. 2A, the host computer 26 instructs the motor control board 28 to move the rod 10a in the positive direction on the X axis. The motor control board 28 determines an appropriate immediate target position, and drives the spindle motor (assigned a reference number $18a_1$) of the actuator unit 16a via the driver unit 32. Hence, the rod 10a is moved along the positive direction on the X axis. Thereafter, the motor control board 28 successively updates the immediate target position.

The host computer 26 monitors the immediate target position which is output to the driver unit 32 by the motor control board 28 and the current position of the rod 10a output by the counter board 30, and always determines whether the difference therebetween falls within a predetermined range. If the determination results show that the difference falls within the predetermined range, the host computer 26 recognizes that the rod 10a is moving toward the immediate target position. The amount of movement of the rod 10a per time can be adjusted by varying the degree of updating the immediate target position. If the rod 10a is required to move a long distance, the updating of the immediate target position is arranged so that the profile of the movement (velocity) of the rod 10a corresponds to a trapezoidal curve.

A mechanism for determining whether the rods 10c, 10d come into contact with the disk 12 will be described in detail later. When the rods 10c, 10d are moved to the target position ((x1+x2)/2, (y1+y2)/2), the host computer 26 provides the motor control board 28 with the coordinates of the target position. The motor control board 28 determines an appropriate immediate target position, which is successively updated.

As has been described previously, the driver unit 32 controls the actuator units 16a–16d in accordance with instructions from the motor control board 28. Further, the drive unit 32 receives the encoder pulses from the actuator units 16a–16d, and outputs the encoder pulses to the counter board 30. The counter board 30 counts, for each of the actuator units 16a–16d, the respective encoder pulse, and thus the respective positions of the rods 10a–10d.

The immediate target position may be the coordinates data or data indicating the amount of movement. For example, in FIG. 6, an amount equal to N pulses of the encoder 19c is selected as the immediate target position, and the counter board 30 counts the pulses of the encoder 19c in order to determine whether the rod 10c of the actuator unit 16c has moved a distance equal to the N pulses. When it is determined that the rod 10c has moved a distance equal to N pulses, the immediate target position is updated so as to be set equal to a given number of pulses which is equal to or different from N pulses.

Now, a description will be given of the mechanism for determining, by using the output pulse of the encoder 19c, whether the rod 10c comes into contact with the disk 12. If the rod 10c is continuously driven after the rod 10c comes into contact with the disk 12, the rod 10c is driven a state in which the disk 12 is in contact with the hub 14 or the opposite rod 10a is in engagement with the disk 12. Such a state is not desirable. Hence, it is required to provide a mechanism capable of promptly detecting the state in which the rod 10c comes into contact with the disk 12. The detecting mechanism calculates the difference between the immediate target position of the rod 10c and the actual position thereof. More particularly, the detecting mechanism calculates the difference between the count value equal to the immediate target position and the current counted number of pulses output by the encoder 19c. Then, the detecting mechanism compares the difference with a given threshold value. Hereinafter, the above difference will be referred to as a movement deviation.

Figure 8:
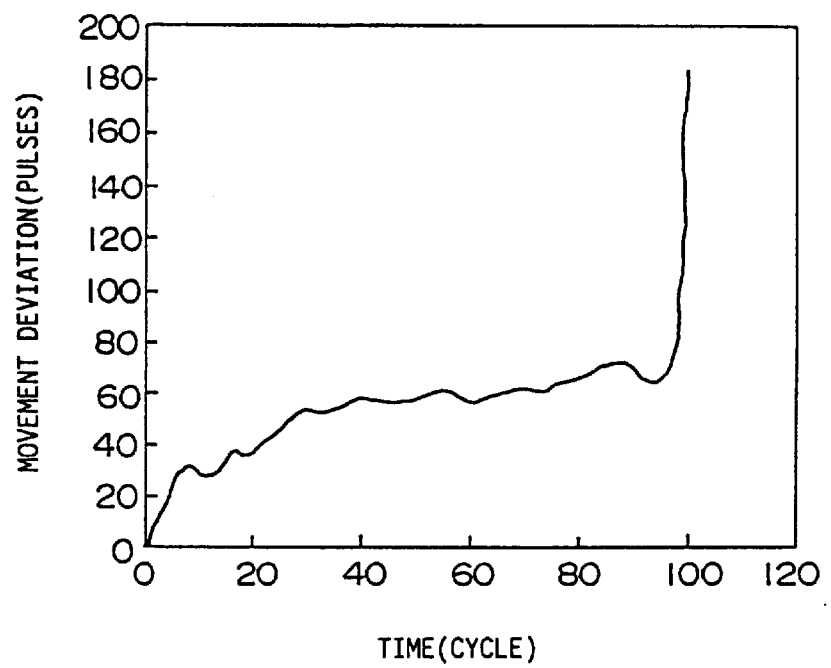
FIG. 8 is a graph of a relationship between the time and a positional deviation obtained using data actually measured.

FIG. 8 is a graph of a relationship between the time and the positional deviation, which graph was obtained using data actually measured. While the rod is being moved, the positional deviation is equal to or less than the given threshold value. That is, the difference between the immediate target position successively updated and the actual rod position is equal to or less than the given threshold value. When the movement of the rod is stopped, the movement deviation increases drastically because the immediate target position is successively updated. If the given threshold value is set equal to 100 pulses, it is possible to recognize that the rod is stopped when the movement deviation exceeds 100 pulses. The host computer 26 reads the count value from the counter board 30 and stores it therein. The aforementioned coordinate values x1, x2, y1 and y2 can be obtained in the above manner.

Hence, it is possible to prevent the rods 10a–10d from forcibly pushing the disk 12.

Figure 9:
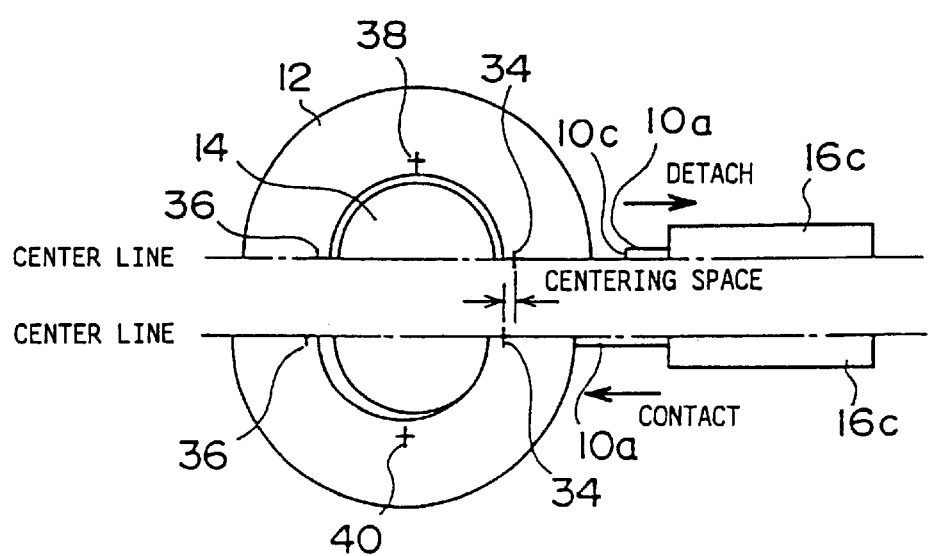
FIG. 9 is a diagram a method for confirming whether the centering operation has duly been executed.

It is possible to confirm whether the above mechanism realizes the centering by a method shown in FIG. 9. The upper part of FIG. 9 shows a state in which the centering operation is completed, and the lower part thereof shows a state in which the rod 10c contacts the disk 12 and the inner edge of the disk 12 is engaged with the hub 14. Given marks 34, 36, 38 and 40 are provided on imaginary lines respectively extending along the four rods 10a–10d from the center of the hub 14. In FIG. 9, only the rod 10c is illustrated for the sake of simplicity. A portion in the vicinity of the mark 34 in a first state in which the disk 12 is centered about the hub 14 is optically read and stored. Further, a portion in the vicinity of the mark 34 in a second state in which the inner edge of the disk 12 is in engagement with the hub 14 is optically read and stored. Then, images respectively obtained in the first and second states are compared with each other in a conventional pattern matching scheme. Hence, it is possible to measure the gap between the inner edge of the disk 12 and the hub 14 in the centered state. Similarly, the gaps for the marks 36, 38 and 40 are obtained. Then, all the gaps are compared and the precision of centering can be obtained from the compared results.

The marks 34, 36, 38 and 40 may be seals which can adhere to the disk 12 or may be light and darkness interface portions which occur at the inner edge.

It is possible to confirm whether the centering has duly been executed by methods other than the method shown in FIG. 9. For example, the target positions of the rods 10a and 10b are obtained in the same manner as the aforementioned manner for the rods 10c and 10d. The actual positions of the rods 10a and 10b are measured after the centering. Then, the target positions of the rods 10a and 10b are compared with the actual positions thereof. If the comparison results are less than a predetermined threshold value, the centering has duly been executed. If not, the centering is incomplete. The above can be executed by the host computer 26.

When the respective target positions of the rods 10a–10d are obtained, the four rods 10a–10d can be simultaneously moved in the centering operation.

A description will now be given of a centering apparatus according to a second embodiment of the present invention. The second embodiment of the present invention has a multilayer structure of actuator units while the first embodiment thereof has a single-layer structure. The second embodiment of the present invention makes it possible to center a plurality of disks arranged in a stacked formation. If a plurality of sets of actuator units, each having some actuator units like those 16a–16d, are merely stacked to realize the multilayer structure, a disadvantage will occur in which the length of the multilayer structure for the actuator units is greater than the multilayer structure for the disks. Hence, all the disks arranged in the stacked formation cannot be centered simultaneously.

Figure 10A:
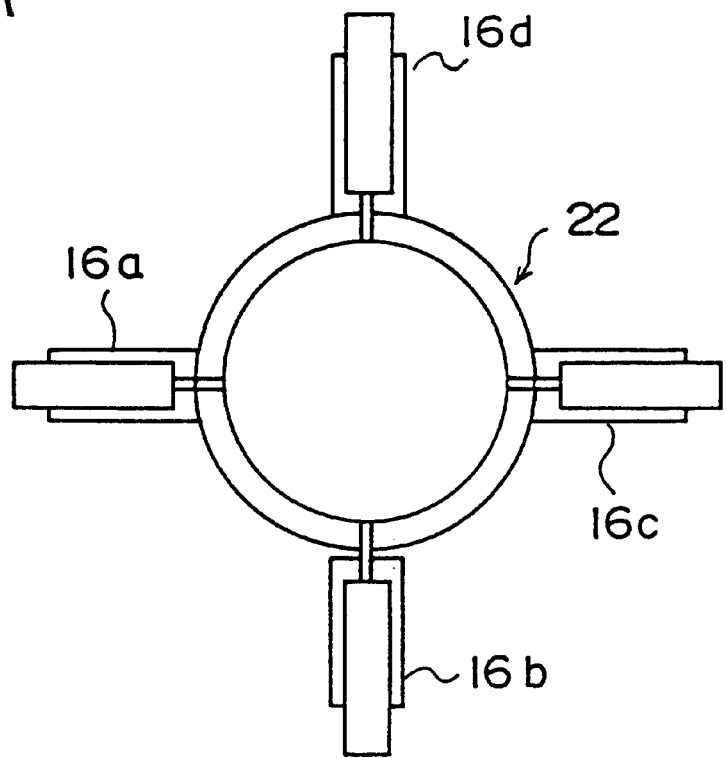
FIG. 10A is a plan view of a centering apparatus according to a second embodiment of the present invention.
Figure 10B:
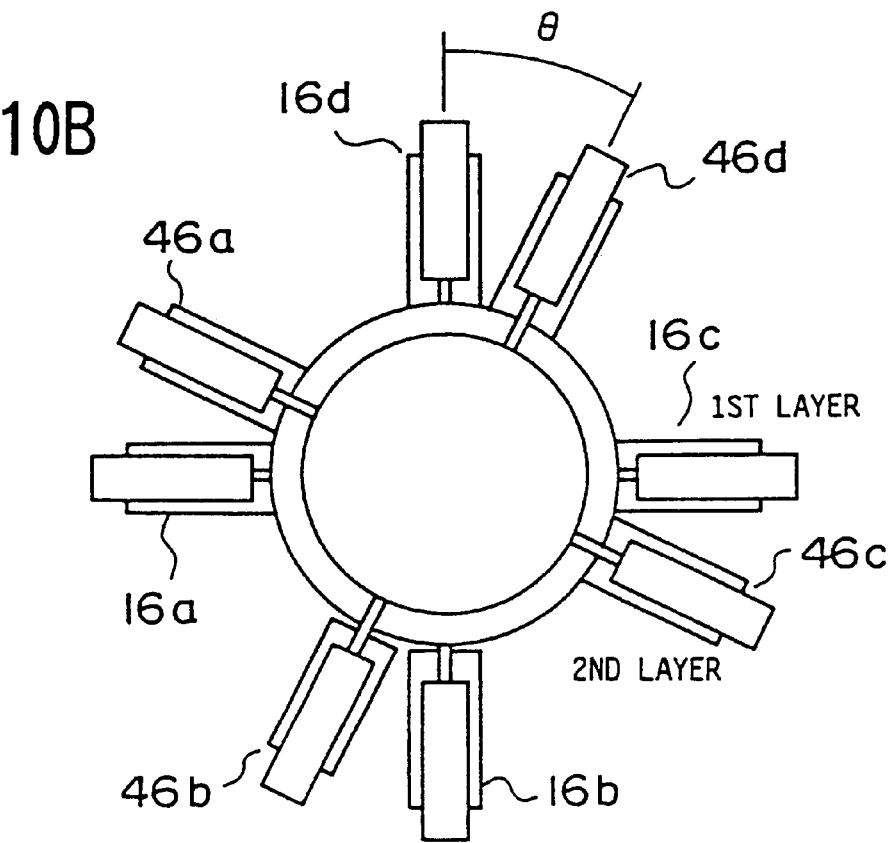
FIG. 10B is another plan view of the centering apparatus according to the second embodiment of the present invention.

With the above in mind, according to the second embodiment of the present invention, as shown in FIG. 10A, the second layer including actuator units 46a–46d is shifted by an angle θ with respect to the first layer including the actuator units 16a–16d. A side view of the above arrangement shows that the first layer and the second layer overlap. Hence, it is possible to stack the first and second layers of actuator units at an interval equal to the pitch at which the first and second layers of disks.

Figure 11C:
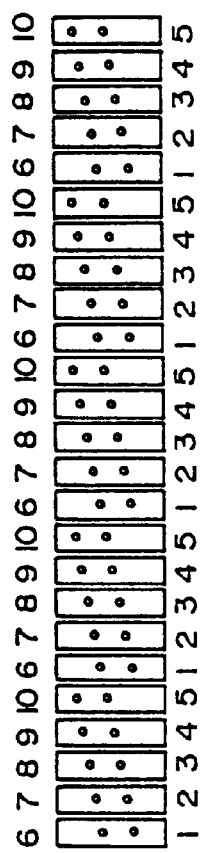
FIG. 11C is an expanded view in which the rod positions obtained when viewed from the center of the hub are expanded in the plane.
Figure 11D:
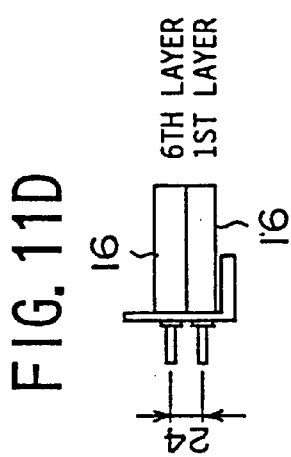
FIG. 11D is a side view of the sixth layer of the actuator units.
Figure 11A:
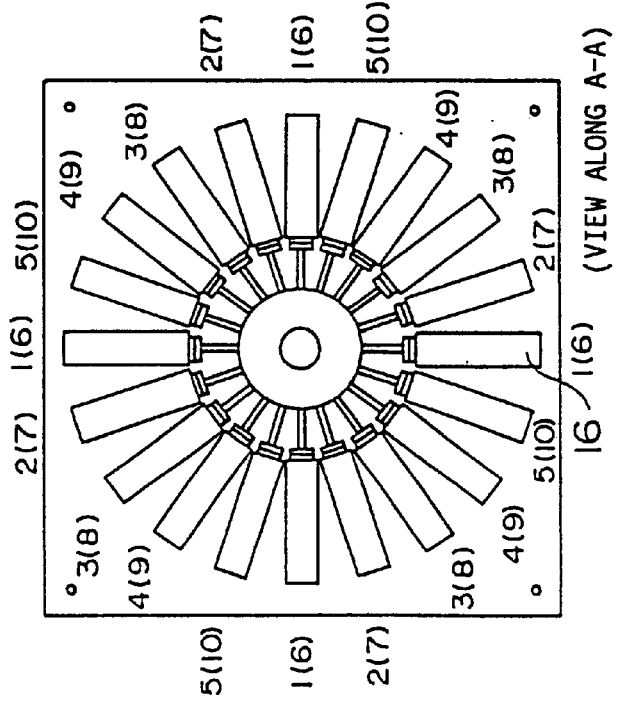
FIG. 11A is a plan view of a centering apparatus having 10 layers of actuator units.
Figure 11B:
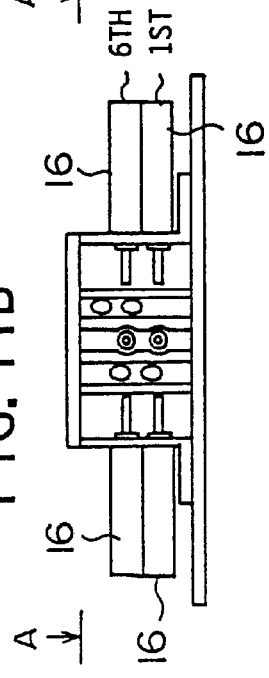
FIG. 11B is a side view of the centering apparatus shown in FIG. 11A.

FIGS. 11A through 11D are diagrams of a centering apparatus having ten layers of actuator units. A stacked structure having 10 layers will now be assumed in which the space between the adjacent layers of disks is equal to 4.8 mm. As shown in FIG. 11A, the first through fifth layers of actuator units are stacked so that the adjacent layers are rotated at an angle of 18°. In FIGS. 11A through 11D, all the actuator units are assigned a reference number 16. Further, the sixth through tenth layers of actuator units are stacked so that the adjacent layers are rotated at an angle of 18° and the sixth to tenth layers respectively overlap the first to fifth layers, as shown in FIGS. 11A and 11B. For example, the sixth layer is oriented in the same direction as that in which the first layer is oriented. In FIG. 11A, reference numbers 1 through 5 respectively denote the first through fifth layers, and reference numbers (6) through (10) respectively denote the sixth through tenth layers. The space or distance between the first disk layer and the sixth disk layer is as follows:

$$4.8 \times (6-1) = 24 \text{ mm}.$$

In this case, it is required to arrange that the sixth layer of actuator units is spaced apart from the first layer thereof by 24 mm, as shown in FIG. 11D. Such a distance can be realized by the above-mentioned stacked formation.

FIG. 11C is an expanded view in which the rod positions obtained when viewed from the center of the hub are expanded in the plane. As shown in FIG. 11C, the first and sixth layers of rods overlap in the vertical direction, and the second and seventh layers overlap in the vertical direction. Similarly, the third and eight layers of rods overlap in the vertical direction, and the fourth and ninth layers of rods overlap in the vertical direction. Further, the fifth and tenth layers of rods overlap in the vertical direction.

An electrical control system for the multilayer structure is substantially the same as shown in FIG. 7. The centering operations on all or some of the layers can be simultaneously carried out. Alternatively, it is possible to separately execute the centering operation on each of the layers.

A description will now be given, with reference to FIGS. 12A–12E and FIGS. 13A–13C, of an operation using the centering apparatus having the multilayer structure in which servo track information is recorded on disks arranged in the stacked formation and each of the disks is installed to a respective magnetic disk drive.

Figure 12A:
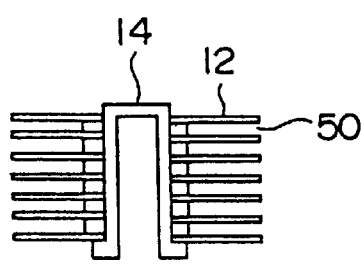
FIG. 12A is a diagram of a sequence of recording servo track information on disks by using the centering apparatus of the present invention.
Figure 12B:
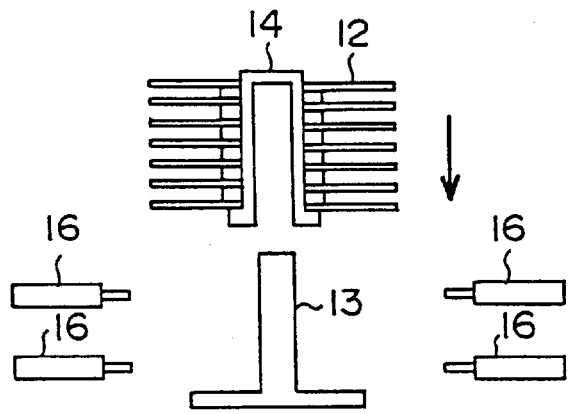
FIG. 12B is a diagram of a sequence of recording servo track information on disks by using the centering apparatus of the present invention.
Figure 12C:
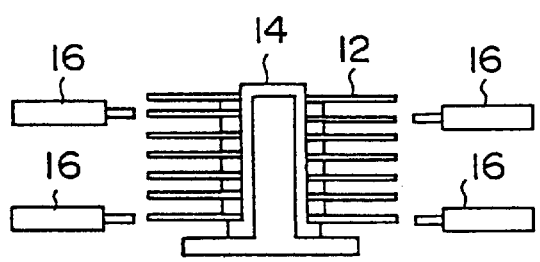
FIG. 12C is a diagram of a sequence of recording servo track information on disks by using the centering apparatus of the present invention.
Figure 12D:
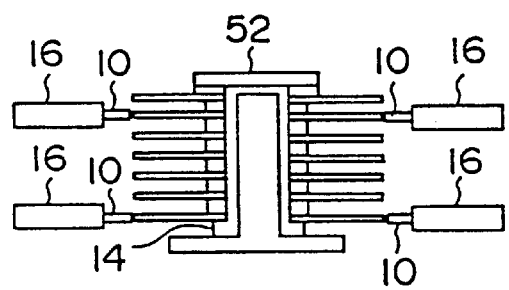
FIG. 12D is a diagram of a sequence of recording servo track information on disks by using the centering apparatus of the present invention.
Figure 12E:
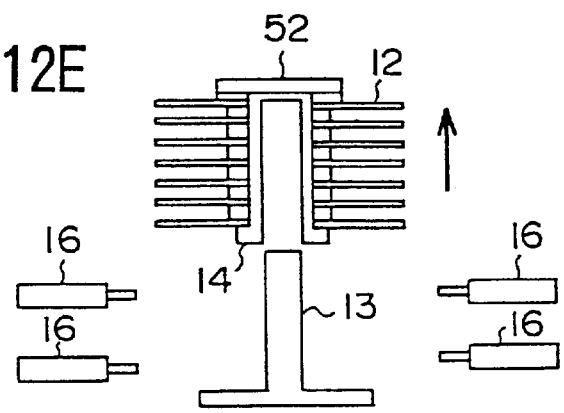
FIG. 12E is a diagram of a sequence of recording servo track information on disks by using the centering apparatus of the present invention.

As shown in FIG. 12A, disks 12 are loaded to the hub 14 so that spacers 50 are interposed between the adjacent disks or layers. Next, as shown in FIG. 12B, the disk unit thus assembled is loaded to a shaft 13 of the centering apparatus. Then, as shown in FIG. 12C, the centering operation is carried out in accordance with the aforementioned sequence. In this case, all or some of the disks can be simultaneously subjected to the centering operation. Alternatively, each of the disks can be separately subjected to the centering operation. It will be noted that only some actuator units 16 are illustrated in FIGS. 12B through 12E. When the centering operation is completed, as shown in FIG. 12D, the rods 10 of the actuator units 16 are in engagement with the outer edges of the disks 12. In this state, a ring 52 is screwed and fastened to the hub 14, so that the disks 12 can be fastened to the hub 14 in the centered state. Then, as shown in FIG. 12E, the actuator units 16 are detached from the disks 12 and the disk unit is detached from the shaft 13 of the centering apparatus.

Figure 13A:
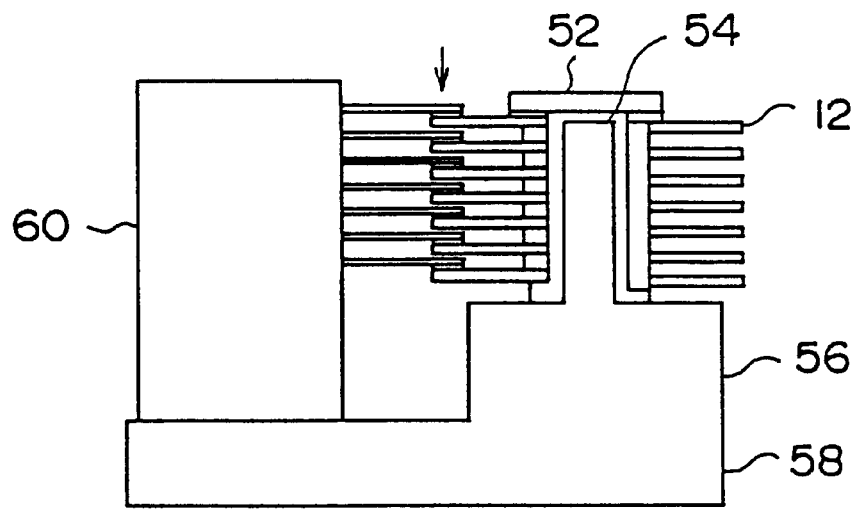
FIG. 13A is a diagram of a sequence of installing disks to respective magnetic disk drives by using the centering apparatus of the present invention.
Figure 13B:
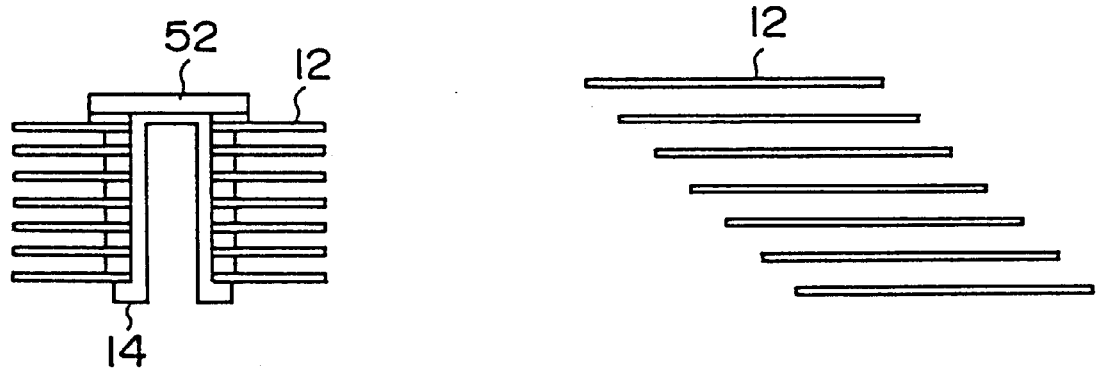
FIG. 13B is a diagram of a sequence of installing disks to respective magnetic disk drives by using the centering apparatus of the present invention.
Figure 13C:
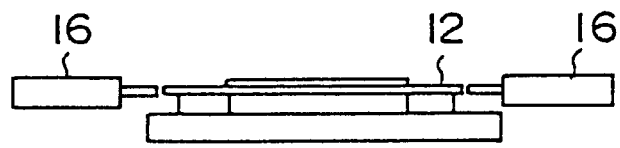
FIG. 13C is a diagram of a sequence of installing disks to respective magnetic disk drives by using the centering apparatus of the present invention.

Then, as shown in FIG. 13A, the disk unit is fastened to a spindle 54 of a servo track information recording apparatus, which includes a driving part 56, a head actuator 60, and a base 58. The driving part 56 drives the spindle 54. The head actuator 60 generates servo track information and supplies it to heads supported by arms extending from the head actuator 60. The base 58 supports the driving part 56 and the actuator 60. While the disks 12 are rotated by rotation of the spindle 54, the servo track information is recorded on the disks 12. Then, as shown in FIG. 13B, the hub 14 is detached from the spindle 54, and the ring 52 is then detached from the hub 14. Finally, as shown in FIG. 13C, the disks 12 are installed to the respective magnetic disk drives and are then subjected to the centering operation so that the disks are centered about the spindles of the drives in accordance with the aforementioned sequence. Then, the disks 12 are fastened to the spindles by screws.

In the first and second embodiments of the present invention, the information concerning the positions of the rods is obtained by using the encoder 19c. Alternatively, an optical measuring device can be used to obtain the information concerning the positions of the rods. The control board 28 shown in FIG. 7 is used to reduce the load of the host computer 26. However, the host computer 26 executes all the functions of the control board 28, which can thus be omitted.

When the centering method (operation) is performed using the centering apparatus shown in FIG. 1, it is preferable that the following items be considered in addition to the structures and operations of the above-mentioned first and second embodiments of the present invention.

First, it is preferable to consider the movement distances of the rods 10a, 10b, 10c and 10d. More particularly, it is preferable to consider the difference between the position x1 of the leading end of the rod 10c obtained when the leading end of the rod 10c as shown in FIG. 2B comes into contact with the disk 12 and the position x2 of the leading end of the rod 10c obtained when the inner edge of the disk 12 comes into contact with the hub 14 as shown in FIG. 2D. The above difference corresponds to the maximum movement distance (in the x direction) of the rods 10a and 10c. Similarly, the difference between the position y1 and the position y2, that is, the maximum movement distance (in the y direction) of the rods 10b and 10d is considered. If the above-mentioned two differences are equal to 0.1 mm, it will be required to ensure a movement distance over the differences of 0.1 mm in practice. The above movement distance will approximately be equal to 0.3 mm when considering the setting and the like.

Second, it is preferable to consider the movement speeds of the rods 10a, 10b, 10c and 10d. As shown in FIGS. 1 through 3B, When the disk 12 is subjected to the centering operation as shown in FIGS. 1 through 3B, each of the rods 10a–10d are moved more than 10 times in practice (for example, the operation shown in FIG. 3A is repeatedly carried out). In order to complete the centering operation of the disk 12 within 20 seconds, the one-time movement of each rod is required to be equal to or shorter than 2 seconds.

Third, it is preferable to consider the positioning accuracy of the disk 12. In order to accurately center the disk 12 accurately, it is preferable to ensure a positioning accuracy of 0.5 $\mu$m in practice although the positioning accuracy is equal to 1 $\mu$m in the previous description given with reference to FIG. 4B.

The first and second embodiments of the present invention employ the following arrangements in order to meet the above-mentioned three requirements. As has been described with reference to FIG. 6, the rotary motion of the spindle motor $18c_1$ is converted into the linear movement by the linear motion guide mechanism $18c_2$, and the encoder 19c measures the position of the spindle motor $18c_1$. More particularly, the target position Po is instructed by a function Po(t) of time, and the difference Pe(t) between the target position Po and the actual position P(t) is calculated as follows:

$$Pe(t)=Po(t)-P(t).$$

When the difference Pe(t) is equal to or greater than a given threshold value (required to meet the above-mentioned three requirements), it is determined that the rod 10c has come into contact with the disk 12. The position P(t) obtained at that time is memoried as the position x1 or x2. Then, the centering operation shown in FIGS. 3A and 3B is performed based on the x1, x2, y1 and y2 thus obtained. The function Pe(t) used to determine whether the rod 10c has come into contact with the disk 12 corresponds to the positional deviation which has been described with reference to FIG. 8.

It is required to cause large amounts of currents to flow in the spindle motors of the actuator units 16a, 16b, 16c and 16d shown in FIGS. 6 and 7 to move the rods at high speeds. The above large amounts of currents are close to the rated current of the spindle motors.

However, when the currents close to the rated current flow in the spindle motors, the disk 12 may be deformed before the determination process for determining whether the rods have come into contact with the disk 12 is completed. This degrades the accuracy of measuring the positions of the rods. Further, there is another possibility. In the case where the rods 10a and 10b are caused to come into contact with the disk 12 in the final step of centering shown in FIG. 3B, either the rod 10a or the rod 10b comes into contact with the disk in advance of the other even if the rods 10a and 10b are simultaneously driven. For example, if the rods 10a and 10c hold the disk in advance of the other rods, the rod 10b is no longer moved and thus the disk 12 is no longer moved to the given position. This degrades the centering accuracy.

A third embodiment of the present invention is arranged taking into account the above-mentioned aspects.

Figure 14:
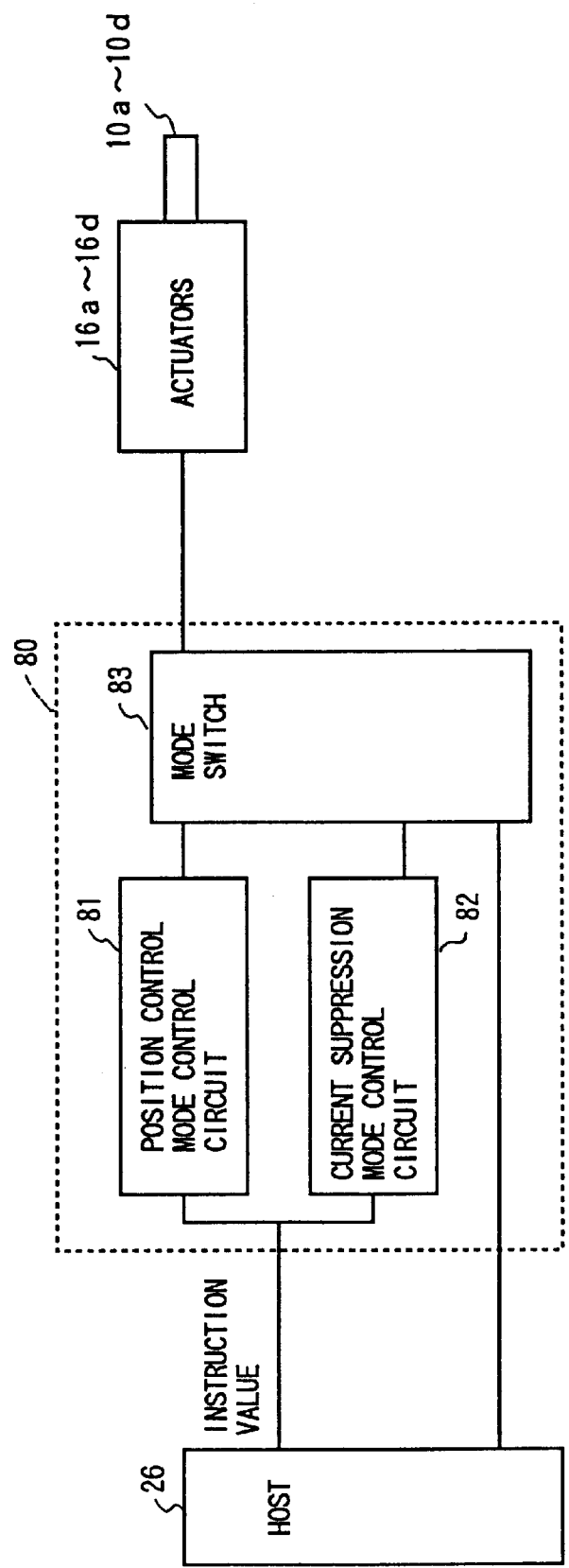
FIG. 14 is a block diagram of an outline of a third embodiment of the present invention.

FIG. 14 is a block diagram showing the principle of the third embodiment of the present invention. A control circuit 80 is provided between the host computer 26 and the actuator units 16a–16d, and includes a position control mode control circuit 81, a current suppression mode control circuit 82, and a mode switch 83. The position control mode control circuit 81 controls an operation mode (position control mode) which is enabled when the rods 10a–10d are moved at high speeds. The current suppression mode control circuit 82 controls an operation mode (a current suppression mode) which is enabled when the rods 10a–10d are moved at speeds lower than the speeds used in the position control mode. The mode switch 83 selects one of the modes in response to an instruction from the host computer 26.

The position control mode causes the currents having amounts close to the rated current to flow in the spindle motors in order to move the rods 10a–10d at high speeds. In this regard, the position control mode is employed in the first and second embodiments of the present invention. However, the third embodiment of the present invention selects the position control mode when the rods 10a–10d are moved close to the disk 12 and are moved back from the disk after the centering operation. In short, the position control mode is suitable for a rough operation or movement as described above.

The current suppression control mode suppresses the currents to be supplied to the spindle motors in response to an instruction from the host computer 26 and moves the rods 10a–10d at speeds lower than the speeds used in the position control mode. The current suppression control mode is suitable for a fine movement such that the rods 10a–10d are about to come into contact with the disk 12.

Figure 15:
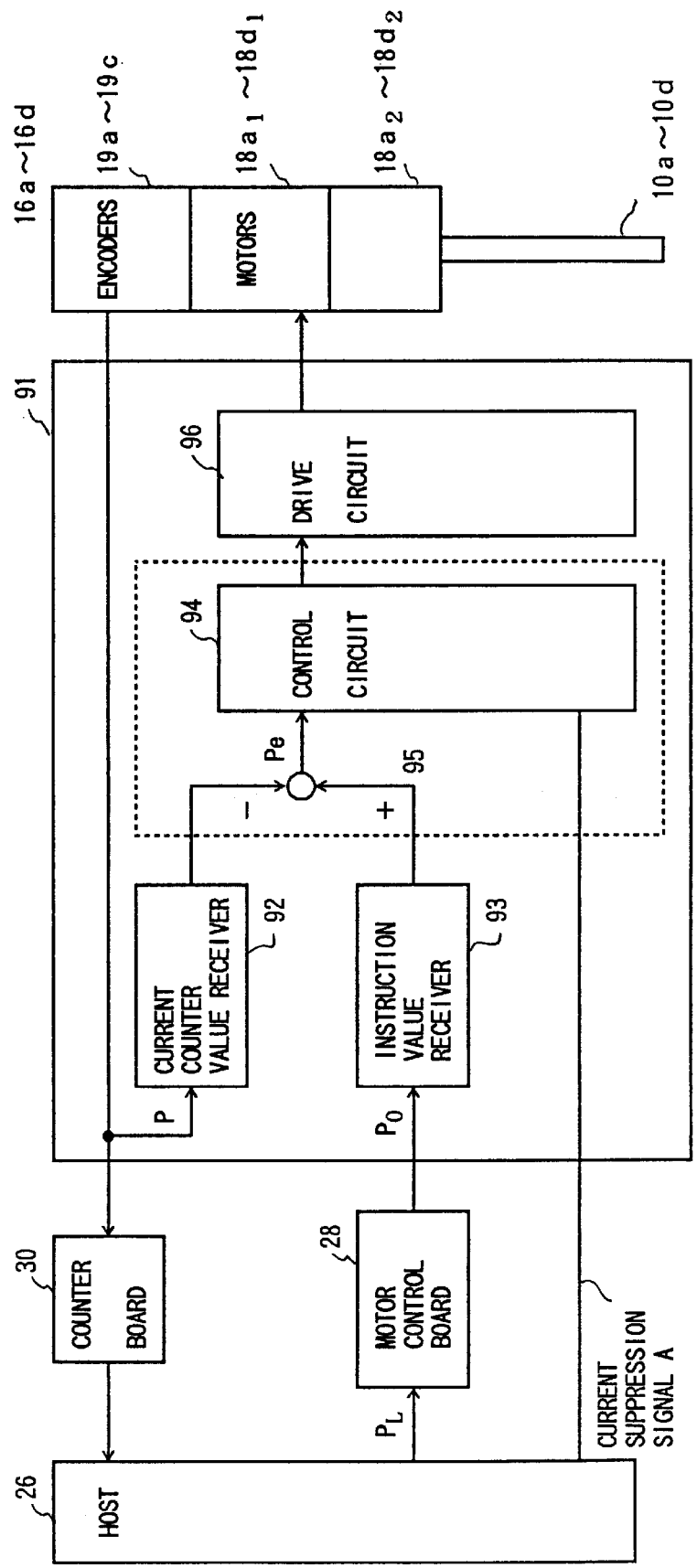
FIG. 15 is a block diagram of an electric system of the centering apparatus according to the third embodiment of the present invention.

FIG. 15 is a block diagram of an electric system of the third embodiment of the present invention, in which parts that are the same as those shown in the previously described figures are given the same reference numbers. The actuator units 16a–16d used in the third embodiment of the present invention are the same as those used in the first and second embodiments thereof.

The electric system shown in FIG. 15 includes a driver unit 91 in addition to the host computer 26, the motor control board 28, and the counter board 30. The driver unit 91 includes a current counter value receiving part 92, an instruction value receiving part 93, a control circuit 94, an operation part 95, and a drive circuit 96.

Figure 16:
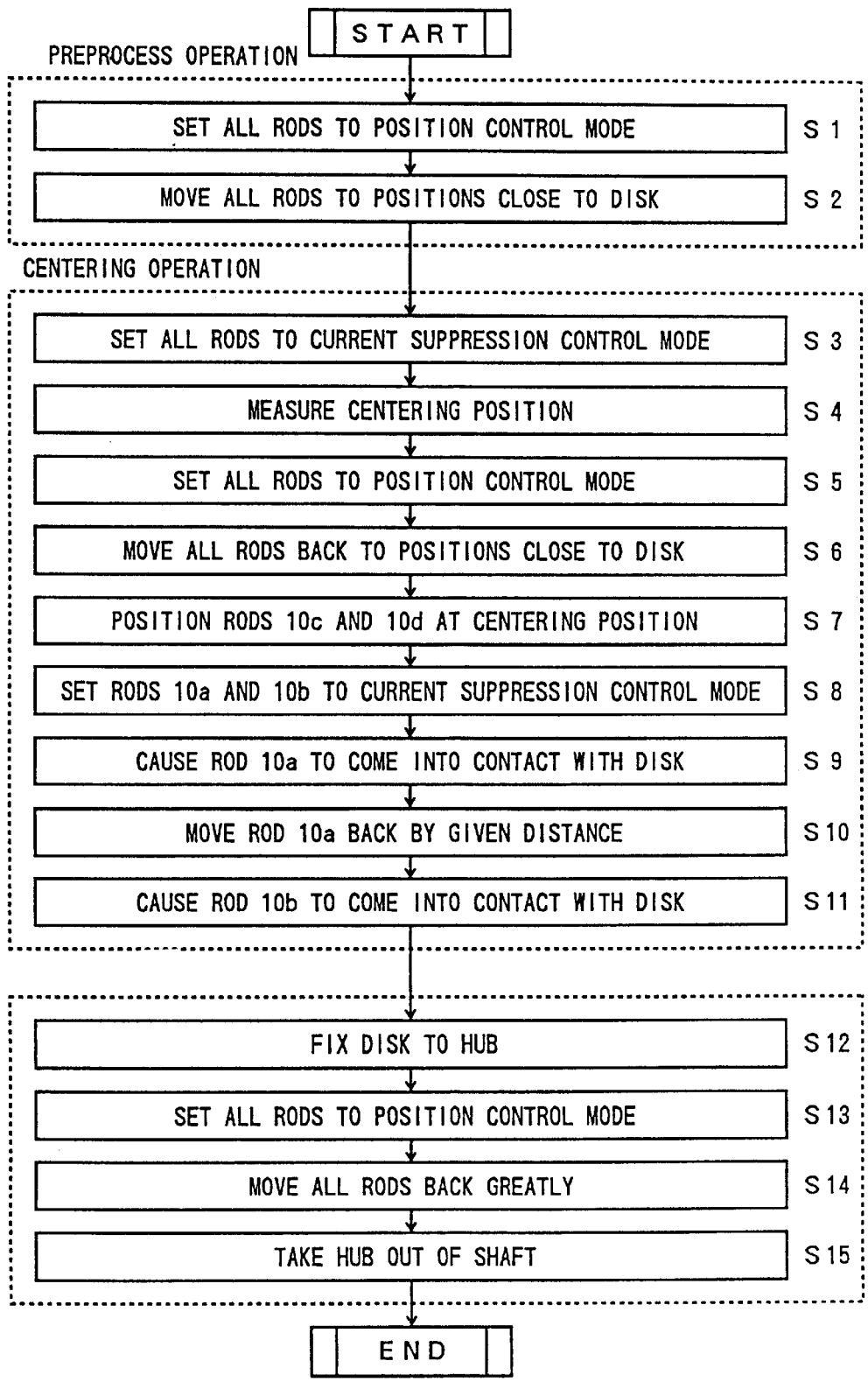
FIG. 16 is a flowchart of a part of a centering operation of the third embodiment of the present invention.
Figure 17:
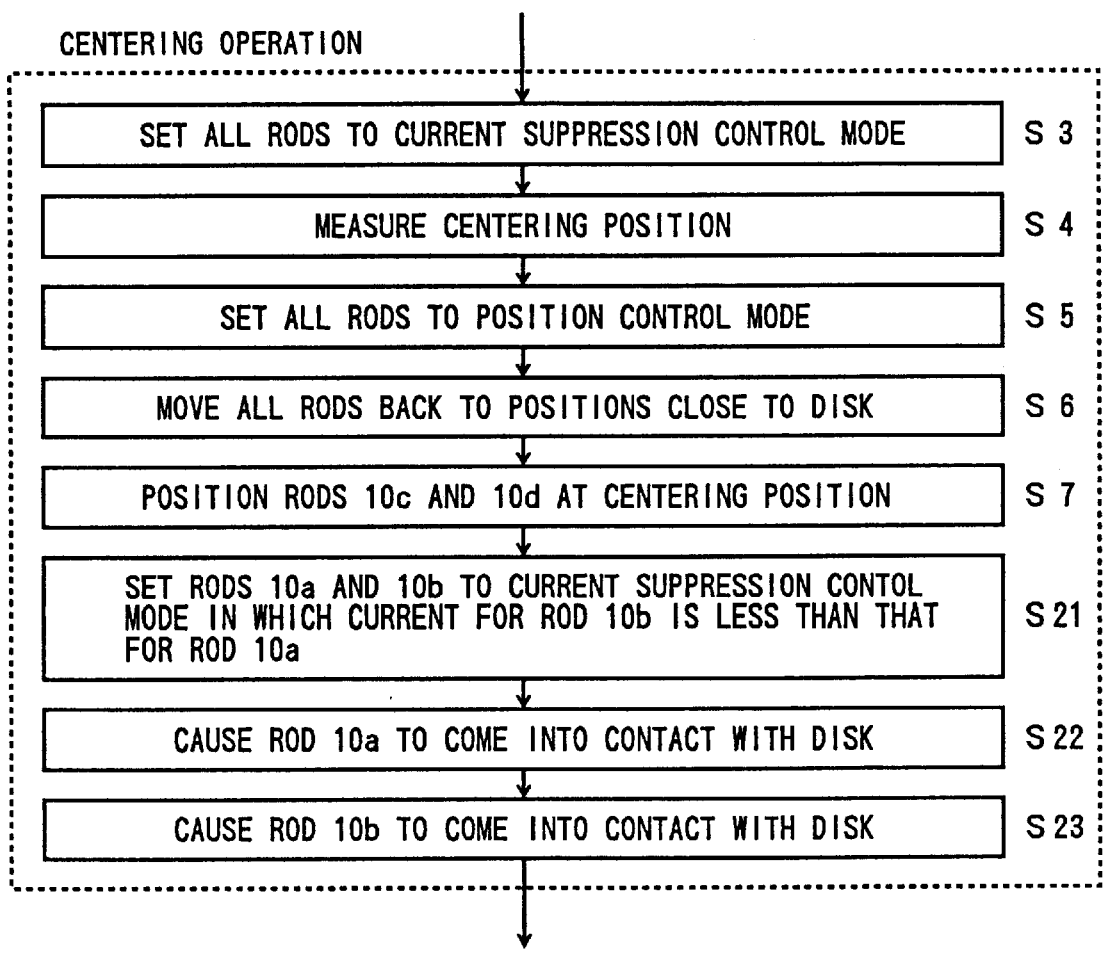
FIG. 17 is a flowchart of another part of the centering operation of the third embodiment of the present invention.

The host computer 26 formed of, for instance, a personal computer, controls the motor control board 28 in accordance with a program for centering shown in FIGS. 16 and 17 while the position control mode and the current suppression control mode are selectively activated. A current suppression signal A is used to select the current suppression control mode or the position control mode. For example, when the current suppression signal A is valid, the current suppression control mode is selected. When the current suppression signal A is invalid, the position control mode is selected.

The counter board 30 detects the encoder pulse from the encoder 19c, and detects the position of the position of the spindle motor $18c_1$, that is, the position of the rod 10c. Further, the encoder pulse is used to determine whether the rod 10c has come into contact with the disk 12 by the host computer 26.

The motor control board 28 drives the driver unit 91 in response to an instruction $P_L$ from the host computer 26. The driver unit 91 supplies the spindle motors provided in the actuator units 16a–16d with given currents. Further, the motor control board 28 generates an appropriate immediate target position Po of the rod to be moved, and drives the corresponding spindle motor via the driver unit 91. Then, the motor control board 28 successively updates the immediate target position Po.

The host computer 26 monitors the immediate target position Po which is output to the driver unit 91 by the motor control board 28 and the current positions P of the rods 10a–10d which are output by the counter board 30, and always determines whether the differences between the immediate target position and the current positions P fall within the given range. The host computer 26 performs the above determining operation irrespective of whether the current mode is the position control mode or the current suppression control mode. When the rods are moved to the target position ((x1+x2)/2, (y1+y2)/2) in the current suppression control mode, the host computer 26 supplies the above target position to the motor control board 28. Then, the motor control board 28 sets an appropriate immediate target position Po and updates it.

As has been described previously, the driver unit 91 controls the actuator units 16a–16d in accordance with the instructions from the motor control board 28. Further, the driver unit 91 receives the encoder pulses from the actuator units 16a–16d, and outputs the received encoder pulses to the counter board 30. Then, the counter board 30 separately counts the encoder pulses of the actuator units 16a–16d, and thus detects the positions P of the rods 10a–10d.

FIG. 16 is a flowchart of an operation of the host computer 26 that is performed when the program of the centering operation is executed.

First, the host computer 26 performs a preprocess for the centering operation so that the current suppression control signal A is set invalid. Hence, all the rods 10a–10d are set to the position control mode (step S1 in FIG. 16). In that state, the driver unit 91 supplies currents ie close to the rated current to the spindle motors in order to move the rods 10a–10d at high speeds. By the above-mentioned manner, the host computer 26 moves the rods 10a–10d close to the disk 12 in the position control mode (high-speed mode) (step S2).

Next, the host computer 26 sets the current suppression control signal A to be valid, so that all the rods 10a–10d are set to the current suppression control mode (step S3). Then, the host computer 26 starts the centering operation. The host computer 26 commences measuring the centering position ((x1+x2)/2, (y1+y2)/2) in accordance with the sequence shown in FIGS. 2A through 2D (step S4).

A description will now be given of an operation of the driver unit 91 which can selectively be set to the position control mode and the current suppression control mode.

Figure 18:
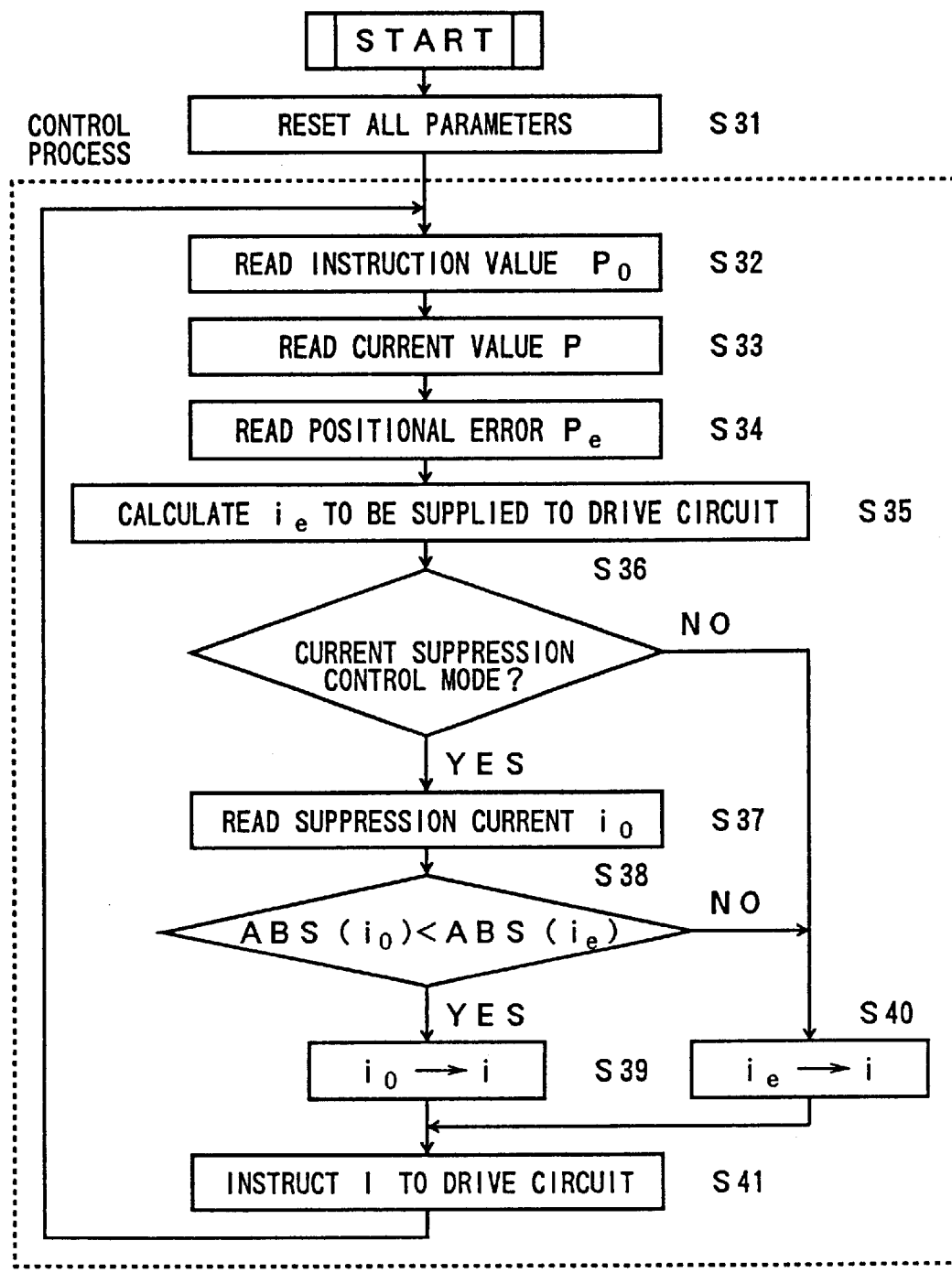
FIG. 18 is a flowchart of an operation of a driver unit used in the third embodiment of the present invention.

When the driver unit 91 is set to the position control mode or the current suppression control mode by the host computer 26, the driver unit 91 resets all parameters such as the current counter value receiving part 92 and the instruction value receiving part 93 (step S31 in FIG. 18). When the motor control board 28 receives the final target position Po which is the instruction value from the host computer 26, the motor control board 28 intermittently outputs the immediate target position Po at given intervals equal to, for example, 1 ms. When the instruction value receiving part 93 receives the immediate target position Po, the operation part 95 reads the received immediate target position Po and the current position received at the current counter value receiving part 92 (which corresponds to the real position P) (steps S32 and S33). Then, the operation part 95 outputs a positional deviation or error Pe (step S34), and informs the control circuit 94 of the positional error Pe. The control circuit 94 calculates the current value ie to be supplied to the drive circuit 96 on the basis of the positional error Pe (step S35). Then, the control circuit 94 confirms whether the current mode is the position control mode or the current suppression control mode (step S36). When the current mode is the current suppression control mode (YES at step S36), the control circuit 94 reads a predetermined maximum current io used in the current suppression control mode (step S37). The control circuit 94 compares the abstract value of the current value ie calculated at step S35 to be supplied to the drive circuit 96 with the absolute value of the maximum current io (step S38). If ABS(io)<ABS(ie) (YES in step S38), the control circuit 94 supplies the maximum current io to the drive circuit 96 as an instruction current i (step S39). A symbol ABS denotes the absolute value. In contrast, if ABS(io)>ABS(ie) (NO in step S38), the control circuit 94 supplies the current value ie to the drive circuit 96 as the instruction current i calculated at step S35 (step S40). Hence, currents exceeding the maximum current io are not supplied to the motors in the current suppression control mode. If the result of step S36 is NO, the driver unit 91 is operating in the position control mode, and the current ie calculated at step S35 is supplied to the drive circuit 96 as the instruction current I (step S40).

The above operation of the driver unit 91 is repeatedly performed, and thus the host computer 26 measures the centering position ((x1+x2)/2, (y1+y2)/2) (step S4). If the current is limited to a value less than the current necessary for acceleration in the current suppression mode, the rod will not sufficiently be accelerated. In this case, the positional deviation becomes large and may erroneously detect a contact with the disk 12. In order to avoid the above problem, it is preferable to set the maximum speed and the maximum acceleration to sufficiently small values in the current suppression control mode. If the maximum speed in the current suppression control mode is set to, for example, ⅕ of the maximum speed in the position control mode, the maximum acceleration in the current suppression control mode may be set to ⅕ of the maximum acceleration in the position control mode in order to reach the maximum speed with the same acceleration time as that obtained in the position control mode. By setting the maximum speed to a low level beforehand, the currents necessary for the acceleration can be set to a low level. Hence, it is possible to reduce the currents flowing in the motors at the time when any of the rods 10a–10d comes into contact with the disk 12 and to reduce force exerted on the disk 12. In addition, it is possible to reduce deformation of the disk which may occur when any of the rods 10a–10d comes into contact with the disk 12.

After the centering position is measured at step S4, the host computer 26 sets the current suppression signal A to be invalid, and thus sets all the rods 10a–10d to the position control mode (step S5). Then, the host computer 26 moves all the rods 10a–10d back to positions close to the disk 12 (step S6). Next, the host computer 26 moves the rods 10c and 10d to the centering position at the high speed in accordance with the sequence shown in FIG. 18 (step S7). Then, the host computer 26 sets only the rods 10a and 10b to the current suppression control mode (step S8), and causes the rod 10a to come into contact with the disk 12 (step S9). Hence, the disk 12 is held by the rods 10c and 10a. Then, the host computer 26 moves the rod 10b back to a given position as close to the disk as possible (step S10), and causes the rod 10b to come into contact with the disk 12 (step S11). Thus, the disk 12 is held by the rods 10c and 10b. The distance by which the rod 10a is moved back at step S10 is taken into account the fact in which a proportional relationship between the force with which the rod 10a pushes the disk 12 and the magnitude of resultant deformation of the disk 12, and is determined so that the holding forces of the rods 10c and 10a can be reduced. For example, if a proportional relationship of 1 kgf/μm is satisfied, the rod 10a is moved back only by 0.5 μm. Hence, the holding force applied at the time of contacting can be reduced by 0.5 kgf. In order to accurately center the disk, it is preferable to correct the centering position taking into consideration the magnitude of deformation. For example, the gap between the disk 12 and the shaft is measured by image processing or the like, and the centering position is corrected based on the measured gap.

Then, the disk 12 is fixed to the hub 14 (step S12). The host computer 26 sets all the rods 10a–10d to the position control mode (step S13) and moves all the rods 10a–10d back greatly. Thereafter, the hub 14 that has been centered is taken out from the shaft (step S15). Then, the centering operation ends.

The centering operation shown in FIG. 16 can be replaced by a centering operation shown in FIG. 17, in which steps that are the same as those shown in FIG. 16 are given the same reference numbers.

After the sequence of steps S3 to S7 is ended, the host computer 26 sets only the rods 10a and 10b to the current suppression control mode (step S21). The currents which drive the motors 18a and 18b are selected so that the current flowing in the motor associated with the rod 10b is greater than that flowing in the motor associated with the rod 10a. In that state, the host computer 26 causes the rod 10a to come into contact with the disk 12 (step S22). Hence, the disk 12 is held by the rods 10c and 10a. Then, the host computer 26 causes the rod 10b to come into contact with the disk 12 (step S23), so that the disk 12 is held by all the rods 10a–10d (see FIG. 3B). In this case, the movement force by the rod 10b is greater than the holding forces by the rods 10c and 10a. Hence, the disk 12 can be moved and the centering accuracy can be prevented from being degraded.

In the case where the centering positions are respectively obtained with respect to the four rods 10a–10d in the third embodiment of the present invention, the four rods 10a–10d can be moved simultaneously.

In the case where the current suppression control mode is enabled in the third embodiment of the present invention, the control circuit 94 informs the drive circuit 96 of the instruction current i. Alternatively, control circuit 94 may control the control circuit 96 by voltage.

According to the third embodiment of the present invention, it is possible to effectively suppress the disk 12 from being deformed and to prevent the position measuring accuracy from being degraded at the time of contacting. Even in the case where the rods 10a and 10c hold the disk 12 in advance of the other rods, the rod 10b can be moved. Hence, the accuracy of centering can be improved.

Figure 19:
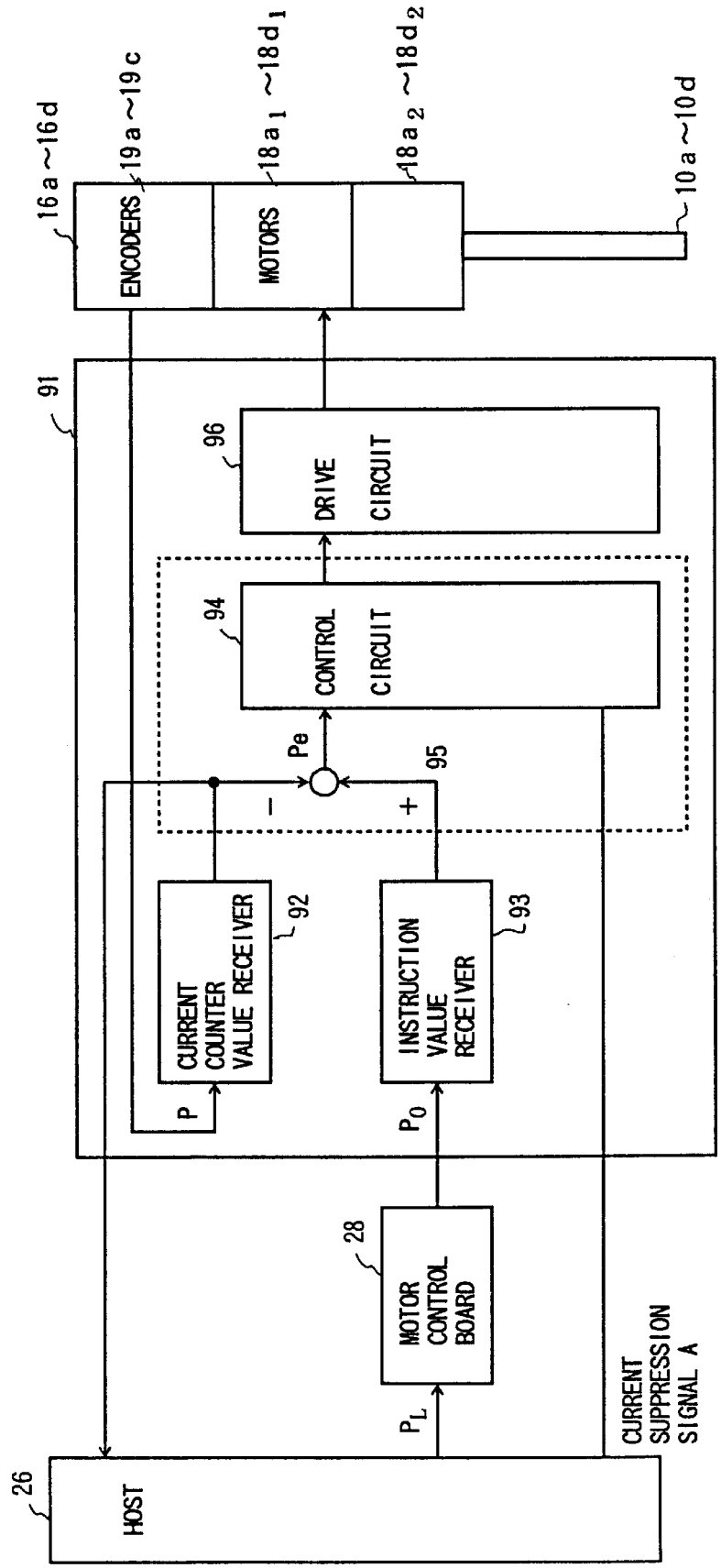
FIG. 19 is a block diagram of a variation of the centering apparatus according to the third embodiment of the present invention.

FIG. 19 is a variation of the third embodiment of the present invention. In FIG. 19, the host computer 26 directly receives the current position P from the current counter value receiving part 92, and the functions of the counter board 30 are implemented by the host computer 26. The operations of the variation shown in FIG. 19 are the same as those shown in FIGS. 16, 17 and 18.

The present invention is not limited to the specifically disclosed embodiments, and variations and modifications may be made without departing from the scope of the present invention.

What is claimed is:

1. A centering apparatus for centering a disk including a circular perimeter and a circular central opening concentric with the perimeter; the apparatus comprising:

a disk-supporting base, over which the disk is slidable;

a plurality of pairs of actuator units disposed adjacent the base; and a center member that is fixed in position relative to the actuator units and is disposed within the central opening of the disk when the disk is on the base;

the actuator units of each of the pairs facing each other through the disk, each of the pairs of actuator units including a respective member which moves linearly to come into contact with the disk, the member being movable by a respective motor;

whereby the disk is movable by the respective motors of the actuator units so that the central opening of the disk contacts the center member acting as a reference for centering the disk.

2. The centering apparatus as claimed in claim 1, wherein the plurality of pairs of actuator units are respectively located in radial directions of the disk.

3. The centering apparatus as claimed in claim 1, further comprising:

a mode switching part which selects one of a plurality of predetermined modes in accordance with a situation of centering; and a control part which controls the plurality of pairs of actuator units in accordance with a selected one of the predetermined modes.

4. The centering apparatus as claimed in claim 3, wherein the plurality of predetermined modes are a first mode in which members of the plurality of pairs of actuator units are moved at a first speed, and a second mode in which the members of the plurality of pairs of actuator units are moved at a second speed lower than the first speed.

5. A centering apparatus for centering a disk including a central opening, the apparatus comprising a plurality of pairs of actuator units and a center member disposed within the central opening of the disk;

the actuator units of each of the pairs facing each other through the disk, each of the pairs of actuator units including a member which moves linearly and can come into contact with the disk;

the plurality of pairs of actuator units include a first pair of actuator units which face each other via the disk and respectively include first and second rods which move linearly in a first direction, and a second pair of actuator units which face each other via the disk and respectively include third and forth rods which move linearly in a second direction, wherein the second direction is not parallel to the first direction;

the first and second pairs of actuator units act to center the disk at a centered position defined relative to actuator positions (x1+x2)/2, (y1+y2)/2), where:

x1 is a position of the second rod which contacts an outer perimeter of the disk in a state in which the first rod contacts the outer perimeter of the disk and an inner edge thereof contacts the center member;

x2 is a position of the second rod which contacts the outer perimeter in a state in which the inner edge contacts the center member in a position different from that in which the inner edge contacts the center member when the position of the second rod is said x1;

y1 is a position of the fourth rod which contacts the outer perimeter of the disk in a state in which the third rod contacts the outer perimeter of the disk and the inner edge contacts the center member; and y2 is a position of the fourth rod which contacts the outer perimeter in a state in which the inner edge contacts the center member in a position different from that in which the inner edge contacts the center member when the position of the fourth rod is said y1; whereby the first and second pairs of actuator units are drivable to center the disk at the centered position by driving the second rod to the actuator position (x1+x2)/2 while driving the fourth rod to the actuator position (y1+y2)/2), and/or by driving the first rod to the actuator position (x1+x2)/2 less an outer diameter of the disk while driving the third rod to the actuator position (y1+y2)/2 less the outer diameter of the disk.

6. The centering apparatus as claimed in claim 5, further comprising:

a mode switching part which selects a first mode or a second mode in accordance with a situation of centering; and a control part which controls the plurality of pairs of actuator units in accordance with either the first mode or the second mode;

wherein members of the plurality of actuator units are moved at a first speed in the first mode, and are moved at a second speed lower than the first speed in the second mode, and wherein the control part moves the members in the second mode when the members come into contact with the disk and centers the disk about the center member.

7. The centering apparatus as claimed in claim 5, further comprising a control member which determines, for each of the actuator units, that the member is stopped when a difference between an input movement amount applied to a corresponding one of the actuator units and an actual movement amount of the member exceeds a tolerable amount.

8. The centering apparatus as claimed in claim 5, wherein the first and second pairs of actuator units are drivable to center the disk at the centered position by driving the second rod to the actuator position (x1+x2)/2 while driving the fourth rod to the actuator position (y1+y2)/2).

9. The centering apparatus as claimed in claim 5, further comprising a part which obtains a centering position for the first and third rods of the first and second pairs of actuator units and which determines, based on the centering positions for all the rods of the first and second pairs of actuator units, whether the disk has duly been centered about the center member.

10. The centering apparatus as claimed in claim 1, wherein:

the centering apparatus comprises a control part which controls currents respectively supplied to the motors in accordance with a centering situation.

11. The centering apparatus as claimed in claim 10, wherein:

the control part controls the currents respectively supplied to the motors so that one of the pairs of actuator units which is first driven is supplied with a current having a first amount and another one of the pairs of actuator units which is second driven is supplied with a current having a second amount less than the first amount.

12. The centering apparatus as claimed in claim 10, wherein:

the control part controls the currents respectively supplied to the motors so that one of the pairs of actuator units which is first driven is supplied with a current having a first amount and another one of the pairs of actuator units which is second driven is supplied with a current having a second amount equal to the first amount.

13. The centering apparatus as claimed in claim 1, further comprising a control part which determines, for each of the actuator units, that the member is stopped when a difference between an input movement amount applied to a corresponding one of the actuator units and an actual movement amount of the member exceeds a tolerable amount.

14. The centering apparatus as claimed in claim 13, further comprising another part which outputs information concerning a position of the member obtained when it is determined that the member is stopped.

15. The centering apparatus as claimed in claim 1, wherein the actuator units of one of the plurality of layers are arranged in an identical direction in which the actuator units of another one of a plurality of layers are arranged.

16. The centering apparatus as claimed in claim 1, wherein the disk is a recording medium.

17. The centering apparatus as claimed in claim 1, wherein the plurality of actuator units are arranged in a stacked formation.

18. A centering method for centering a disk including a central opening about a center member, the center member being disposed within the central opening, said centering method comprising the steps of:

driving a plurality of pairs of actuator units, the actuator units of each of the pairs facing each other through the disk, each of the actuator units including a respective member which moves linearly and can come into contact with the disk, each member of the actuator units being movable by a respective motor; and centering the disk by the plurality of pairs of actuator units.

19. The centering method as claimed in claim 18, further comprising the steps of:

selecting one of a plurality of predetermined modes in accordance with a situation of centering; and controlling the plurality of pairs of actuator units in accordance with the selected one of the predetermined modes.

20. The centering method as claimed in claim 18, further comprising the steps of:

moving members of the plurality of pairs of actuator units at a first speed; and moving the members of the plurality of pairs of actuator units at a second speed lower than the first speed.

21. A centering method for centering a disk about a center member, comprising the steps of:

driving a plurality of pairs of actuator units, the actuator units of each of the pairs facing each other through the disk, each of the actuator units including a member which moves linearly and can come into contact with the disk;

centering the disk by the plurality of pairs of actuator units;

providing first and second pairs of actuator units to center the disk at a centered position, wherein the first pair of actuator units face each other via the disk and respectively include first and second rods which move linearly in a first direction, and the second pair of actuator units which face each other via the disk and respectively include third and fourth rods which move linearly in a second direction, wherein the second direction is not parallel to the first direction; and driving the first and second pairs of actuator units to center the disk at the centered position by driving at least one of the actuator units of each of the pairs to respective positions $(x1+x2)/2$, $(y1+y2)/2)$, the centered position being defined relative to the respective positions $(x1+x2)/2$, $(y1+y2)/2)$;

where:

x1 is a position of the second rod which contacts the outer perimeter of the disk in a state in which the first rod contacts the outer perimeter of the disk and an inner edge thereof contacts the center member;

x2 is a position of the second rod which contacts the outer perimeter in a state in which the inner edge contacts the center member in a position different from that in which the inner edge contacts the center member when the position of the second rod is said x1;

y1 is a position of the fourth rod which contacts the outer perimeter of the disk in a state in which the third rod contacts the outer perimeter of the disk and the inner edge contacts the center member; and y2 is a position of the fourth rod which contacts the outer perimeter in a state in which the inner edge contacts the center member.

* * * * *